US012562489B2

(12) United States Patent
Chang et al.

(10) Patent No.: US 12,562,489 B2
(45) Date of Patent: Feb. 24, 2026

(54) MOBILE DEVICE SUPPORTING WIDEBAND OPERATION

(71) Applicant: Acer Incorporated, New Taipei (TW)

(72) Inventors: Kun-Sheng Chang, New Taipei (TW); Ching-Chi Lin, New Taipei (TW)

(73) Assignee: ACER INCORPORATED, New Taipei (TW)

( * ) Notice: Subject to any disclaimer, the term of this patent is extended or adjusted under 35 U.S.C. 154(b) by 390 days.

(21) Appl. No.: 18/298,434

(22) Filed: Apr. 11, 2023

(65) Prior Publication Data

US 2024/0178561 A1 May 30, 2024

(30) Foreign Application Priority Data

Nov. 28, 2022 (TW) ................................. 111145384

(51) Int. Cl.
*H01Q 9/42* (2006.01)
*H01Q 5/20* (2015.01)
*H01Q 5/371* (2015.01)
*H01Q 5/378* (2015.01)

(52) U.S. Cl.
CPC ................. *H01Q 9/42* (2013.01); *H01Q 5/20* (2015.01); *H01Q 5/371* (2015.01); *H01Q 5/378* (2015.01)

(58) Field of Classification Search
CPC .......... H01Q 5/371; H01Q 5/378; H01Q 5/20; H01Q 9/42
See application file for complete search history.

(56) References Cited

U.S. PATENT DOCUMENTS

2008/0180330 A1* 7/2008 Wei-Shan .............. H01Q 5/371
343/700 MS
2018/0048076 A1* 2/2018 Wei ........................ H01Q 21/30
2023/0028988 A1* 1/2023 Li .......................... H01Q 5/371
2023/0223710 A1* 7/2023 Chen .................... H01Q 9/0414
343/702

* cited by examiner

*Primary Examiner* — Amal Patel
(74) *Attorney, Agent, or Firm* — McClure, Qualey & Rodack, LLP

(57) ABSTRACT

A mobile device supporting wideband operations includes a first radiation element, a second radiation element, a third radiation element, a fourth radiation element, a fifth radiation element, a sixth radiation element, and a seventh radiation element. The first radiation element has a feeding point. The second radiation element and the third radiation element are coupled to the first radiation element. The first radiation element is coupled through the fourth radiation element to a ground voltage. The fifth radiation element is coupled to the fourth radiation element. The sixth radiation element is coupled to the ground voltage. The sixth radiation element is adjacent to the first radiation element and the third radiation element. The seventh radiation element is coupled to the sixth radiation element. The seventh radiation element extends away from the third radiation element.

13 Claims, 4 Drawing Sheets

400

MOBILE DEVICE SUPPORTING WIDEBAND OPERATION

CROSS REFERENCE TO RELATED APPLICATIONS

This application claims priority of Taiwan Patent Application No. 111145384 filed on Nov. 28, 2022, the entirety of which is incorporated by reference herein.

BACKGROUND OF THE INVENTION

Field of the Invention

The disclosure generally relates to a mobile device, and more particularly, to a mobile device supporting wideband operations.

Description of the Related Art

With the advancements being made in mobile communication technology, mobile devices such as portable computers, mobile phones, multimedia players, and other hybrid functional portable electronic devices have become more common. To satisfy consumer demand, mobile devices can usually perform wireless communication functions. Some devices cover a large wireless communication area; these include mobile phones using 2G, 3G, and LTE (Long Term Evolution) systems and using frequency bands of 700 MHZ, 850 MHz, 900 MHz, 1800 MHZ, 1900 MHZ, 2100 MHZ, 2300 MHz, and 2500 MHz. Some devices cover a small wireless communication area; these include mobile phones using Wi-Fi systems and using frequency bands of 2.4 GHz, 5.2 GHz, and 5.8 GHz.

Antennas are indispensable elements for wireless communication. If an antenna for signal reception and transmission has insufficient operational bandwidth, it may impact the communication quality of the mobile device in question. Accordingly, it has become a critical challenge for designers to design a small-size, wideband antenna structure.

BRIEF SUMMARY OF THE INVENTION

In an exemplary embodiment, the invention is directed to a mobile device supporting wideband operations. The mobile device includes a first radiation element, a second radiation element, a third radiation element, a fourth radiation element, a fifth radiation element, a sixth radiation element, and a seventh radiation element. The first radiation element has a feeding point. The second radiation element is coupled to the first radiation element. The third radiation element is coupled to the first radiation element. The third radiation element and the second radiation element substantially extend in opposite directions. The first radiation element is coupled through the fourth radiation element to a ground voltage. The fifth radiation element is coupled to the fourth radiation element. The fifth radiation element is adjacent to the second radiation element. The sixth radiation element is coupled to the ground voltage. The sixth radiation element is adjacent to the first radiation element and the third radiation element. The seventh radiation element is coupled to the sixth radiation element. The seventh radiation element extends away from the third radiation element. An antenna structure is formed by the first radiation element, the second radiation element, the third radiation element, the fourth radiation element, the fifth radiation element, the sixth radiation element, and the seventh radiation element.

In some embodiments, the combination of the first radiation element, the second radiation element, and the third radiation element substantially has a T-shape.

In some embodiments, the fourth radiation element substantially has a relatively long L-shape, and the fifth radiation element substantially has a relatively short L-shape.

In some embodiments, the fifth radiation element is coupled to the central point on the fourth radiation element. The fourth radiation element includes a first portion and a second portion with equal lengths. The central point is positioned between the first portion and the second portion.

In some embodiments, an angle is formed between the seventh radiation element and the sixth radiation element, and the angle is from 30 to 70 degrees.

In some embodiments, the antenna structure covers a first frequency band, a second frequency band, and a third frequency band. The first frequency band is from 2400 MHz to 2500 MHz. The second frequency band is from 5150 MHz to 5850 MHz. The third frequency band is from 5925 MHz to 7125 MHz.

In some embodiments, the total length of the first radiation element and the second radiation element is substantially equal to 0.25 wavelength of the first frequency band. The total length of the first radiation element and the third radiation element is substantially equal to 0.25 wavelength of the second frequency band.

In some embodiments, the length of the fourth radiation element is substantially equal to 0.5 wavelength of the third frequency band.

In some embodiments, the length of the fifth radiation element is substantially equal to 0.25 wavelength of the third frequency band.

In some embodiments, the total length of the sixth radiation element and the seventh radiation element is substantially equal to 0.25 wavelength of the third frequency band.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

Figure 1:
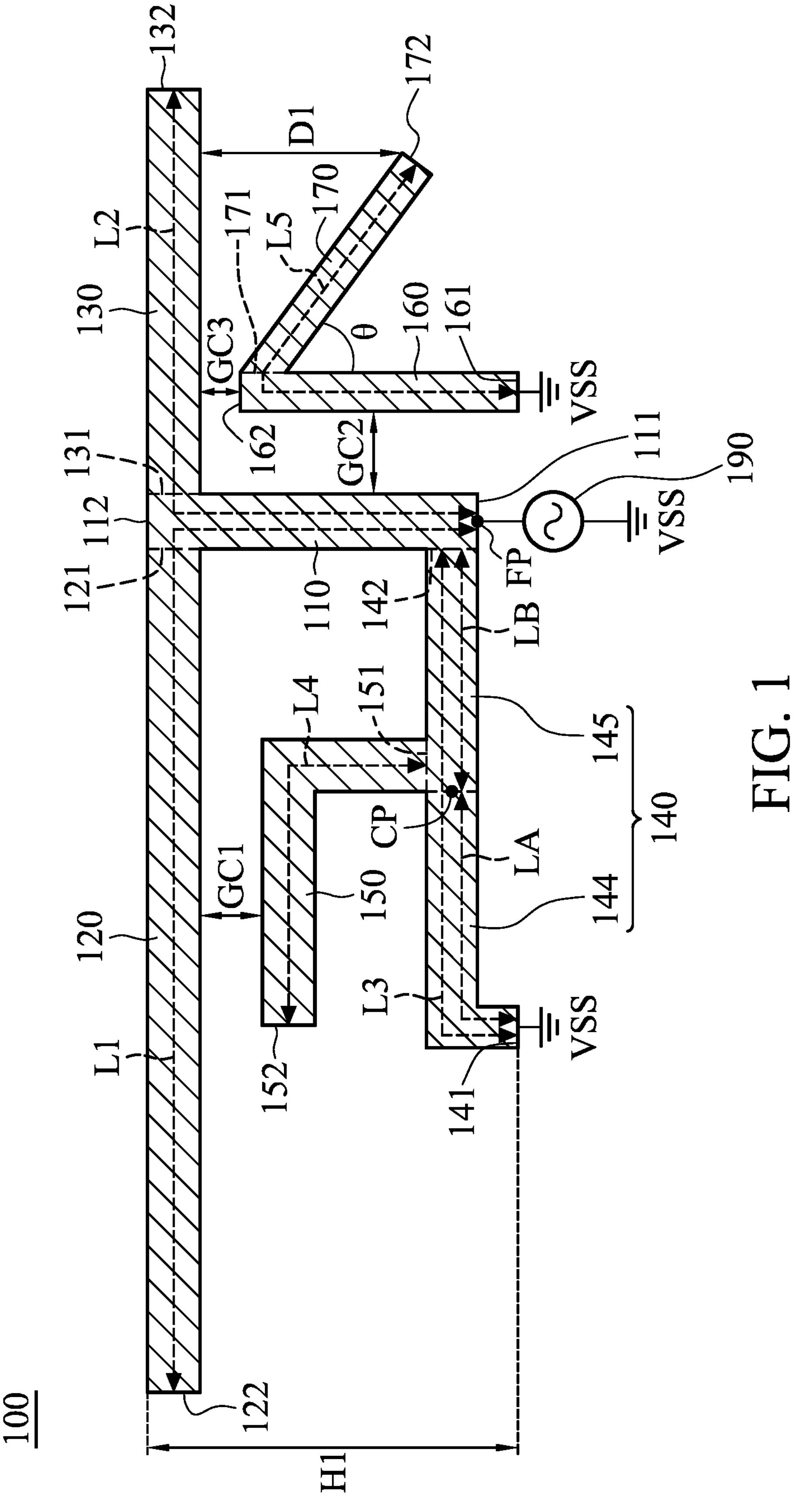
FIG. 1 is a top view of a mobile device according to an embodiment of the invention.

In order to illustrate the purposes, features and advantages of the invention, the embodiments and figures of the invention are shown in detail as follows.

Certain terms are used throughout the description and following claims to refer to particular components. As one skilled in the art will appreciate, manufacturers may refer to a component by different names. This document does not intend to distinguish between components that differ in name but not function. In the following description and in the claims, the terms “include” and “comprise” are used in an open-ended fashion, and thus should be interpreted to mean “include, but not limited to . . . ”. The term “substantially" means the value is within an acceptable error range. One skilled in the art can solve the technical problem within a predetermined error range and achieve the proposed technical performance. Also, the term "couple" is intended to mean either an indirect or direct electrical connection. Accordingly, if one device is coupled to another device, that connection may be through a direct electrical connection, or through an indirect electrical connection via other devices and connections.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Furthermore, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

FIG. 1 is a top view of a mobile device 100 according to an embodiment of the invention. For example, the mobile device 100 may be a smartphone, a tablet computer, or a notebook computer. As shown in FIG. 1, the mobile device 100 includes a first radiation element 110, a second radiation element 120, a third radiation element 130, a fourth radiation element 140, a fifth radiation element 150, a sixth radiation element 160, and a seventh radiation element 170. The first radiation element 110, the second radiation element 120, the third radiation element 130, the fourth radiation element 140, the fifth radiation element 150, the sixth radiation element 160, and the seventh radiation element 170 may all be made of metal materials, such as copper, silver, aluminum, iron, or their alloys. It should be understood that the mobile device 100 may further include other components, such as a processor, a touch control panel, a speaker, a power supply module, and/or a housing, although they are not displayed in FIG. 1.

The first radiation element 110 may substantially have a straight-line shape. Specifically, the first radiation element 110 has a first end 111 and a second end 112. A feeding point FP is positioned at the first end 111 of the first radiation element 110. The feeding point FP may also be coupled to a signal source 190. For example, the signal source 190 may be an RF (Radio Frequency) module.

The second radiation element 120 may substantially have a relatively long straight-line shape, which may be substantially perpendicular to the first radiation element 110. Specifically, the second radiation element 120 has a first end 121 and a second end 122. The first end 121 of the second radiation element 120 is coupled to the second end 112 of the first radiation element 110. The second end 122 of the second radiation element 120 is an open end.

The third radiation element 130 may substantially have a relatively short straight-line shape (compared with the second radiation element 120), which may be substantially perpendicular to the first radiation element 110. Specifically, the third radiation element 130 has a first end 131 and a second end 132. The first end 131 of the third radiation element 130 is coupled to the second end 112 of the first radiation element 110. The second end 132 of the third radiation element 130 is an open end. For example, the second end 132 of the third radiation element 130 and the second end 122 of the second radiation element 120 may substantially extend in opposite directions and away from each other. In some embodiments, the combination of the first radiation element 110, the second radiation element 120, and the third radiation element 130 may substantially have a T-shape.

The fourth radiation element 140 may substantially have a relatively long L-shape. Specifically, the fourth radiation element 140 has a first end 141 and a second end 142. The first end 141 of the fourth radiation element 140 is coupled to a ground voltage VSS. The second end 142 of the fourth radiation element 140 is coupled to the first end 111 of the first radiation element 110. For example, the ground voltage VSS may be provided by a system ground plane (not shown) of the mobile device 100. Thus, the first radiation element 110 is further coupled through the fourth radiation element 140 to the ground voltage VSS. In some embodiments, the fourth radiation element 140 includes a first portion 144 adjacent to the first end 141 and a second portion 145 adjacent to the second end 142. A central point CP is exactly positioned between the first portion 144 and the second portion 145 of the fourth radiation element 140. For example, the first portion 144 and the second portion 145 of the fourth radiation element 140 may substantially have the same lengths, but they are not limited thereto. It should be noted that the term "adjacent" or "close" over the disclosure means that the distance (spacing) between two corresponding elements is smaller than a predetermined distance (e.g., 10 mm or shorter), or means that the two corresponding elements directly touch each other (i.e., the aforementioned distance/spacing therebetween is reduced to 0).

The fifth radiation element 150 may substantially have a relatively short L-shape (compared with the fourth radiation element 140). Specifically, the fifth radiation element 150 has a first end 151 and a second end 152. The first end 151 of the fifth radiation element 150 is coupled to the central point CP of the fourth radiation element 140. The second end 152 of the fifth radiation element 150 is an open end. For example, the second end 152 of the fifth radiation element 150 and the second end 122 of the second radiation element 120 may substantially extend in the same direction. The fifth radiation element 150 is adjacent to the second radiation element 120. A first coupling gap GC1 may be formed between the fifth radiation element 150 and the second radiation element 120.

The sixth radiation element 160 may substantially have a straight-line shape, which may be substantially parallel to the first radiation element 110. Specifically, the sixth radiation element 160 has a first end 161 and a second end 162. The first end 161 of the sixth radiation element 160 is coupled to the ground voltage VSS. The second end 162 of the sixth radiation element 160 extends toward the third radiation element 130. The sixth radiation element 160 is adjacent to the first radiation element 110 and the third radiation element 130. A second coupling gap GC2 may be formed between the sixth radiation element 160 and the first radiation element 110. A third coupling gap GC3 may be formed between the sixth radiation element 160 and the third radiation element 130.

The seventh radiation element 170 may substantially have another straight-line shape, which may not be parallel to the third radiation element 130. Specifically, the seventh radiation element 170 has a first end 171 and a second end 172. The first end 171 of the seventh radiation element 170 is coupled to the second end 162 of the sixth radiation element 160. The second end 172 of the seventh radiation element 170 is an open end, which extends away from the third radiation element 130. In some embodiments, an angle θ is formed between the seventh radiation element 170 and the sixth radiation element 160. The aforementioned angle θ may be an acute angle.

In a preferred embodiment, an antenna structure of the mobile device 100 is formed by the first radiation element 110, the second radiation element 120, the third radiation element 130, the fourth radiation element 140, the fifth radiation element 150, the sixth radiation element 160, and the seventh radiation element 170. In some embodiments, the aforementioned antenna structure is a planar antenna structure, which may be disposed on a dielectric substrate (not shown). For example, the aforementioned dielectric substrate may be an FR4 (Flame Retardant 4) substrate, a PCB (Printed Circuit Board), or an FPC (Flexible Printed Circuit). However, the invention is not limited thereto. In alternative embodiments, the aforementioned antenna structure is modified to a 3D (Three-Dimensional) antenna structure.

Figure 2:
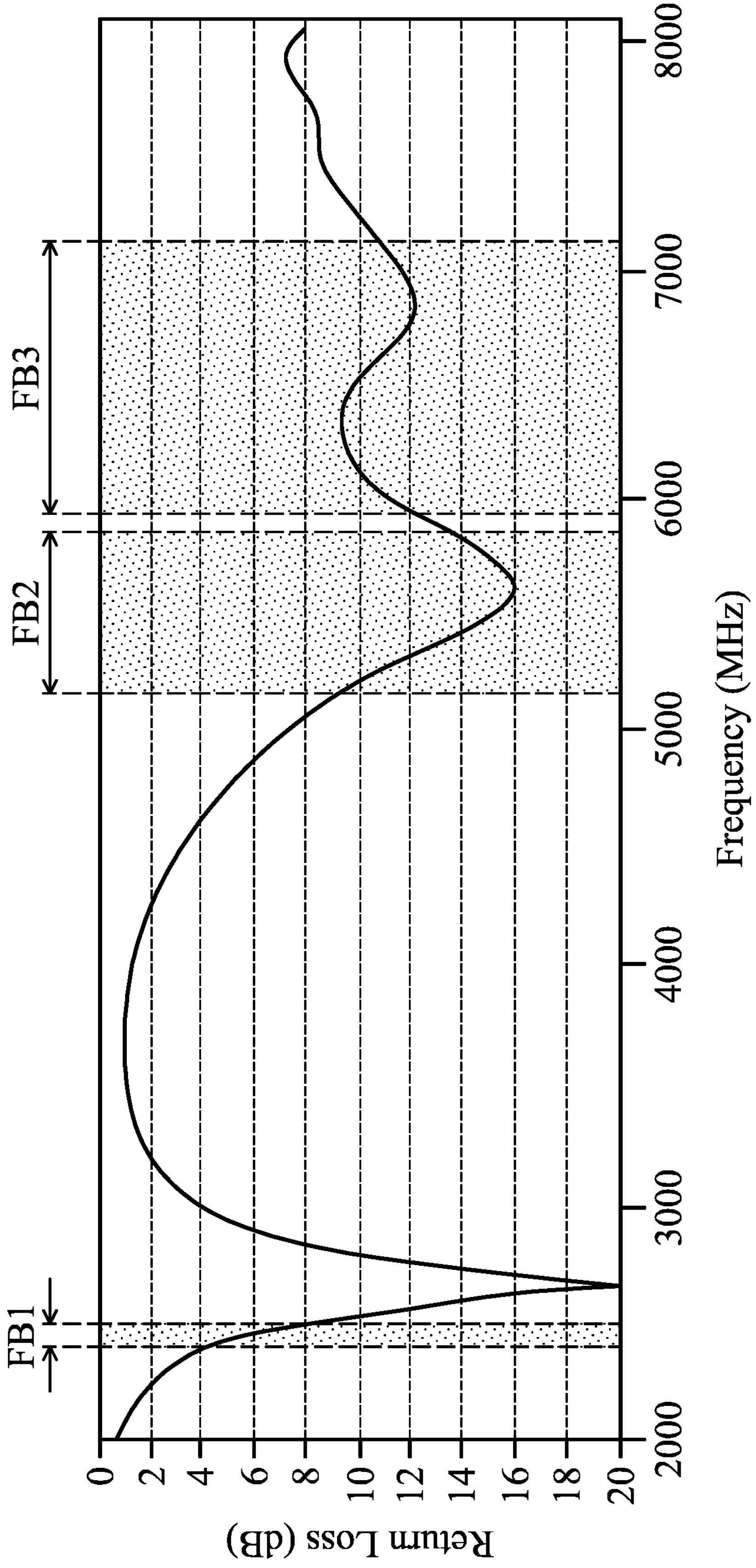
FIG. 2 is a diagram of return loss of an antenna structure of a mobile device according to an embodiment of the invention.

FIG. 2 is a diagram of return loss of the antenna structure of the mobile device 100 according to an embodiment of the invention. The horizontal axis represents the operational frequency (MHz), and the vertical axis represents the return loss (dB). According to the measurement of FIG. 2, the antenna structure of the mobile device 100 can cover a first frequency band FB1, a second frequency band FB2, and a third frequency band FB3. For example, the first frequency band FB1 may be from 2400 MHz to 2500 MHz, the second frequency band FB2 may be from 5150 MHz to 5850 MHz, and the third frequency band FB3 may be from 5925 MHz to 7125 MHz. Therefore, the mobile device 100 can support at least the wideband operations of conventional WLAN (Wireless Local Area Network) and next-generation Wi-Fi 6E.

In some embodiments, the operational principles of the antenna structure of the mobile device 100 will be described as follows. The first radiation element 110 and the second radiation element 120 are excited to generate the aforementioned first frequency band FB1. The first radiation element 110 and the third radiation element 130 are excited to generate the aforementioned second frequency band FB2. The fourth radiation element 140 is excited to generate the aforementioned third frequency band FB3. In addition, the fifth radiation element 150, the sixth radiation element 160, and the seventh radiation element 170 are configured to fine-tune the impedance matching of the aforementioned third frequency band FB3. According to practical measurements, if the seventh radiation element 170 is added and it extends away from the third radiation element 130, the operational bandwidths of the aforementioned second frequency band FB2 and third frequency band FB3 can be significantly improved.

Figure 3:
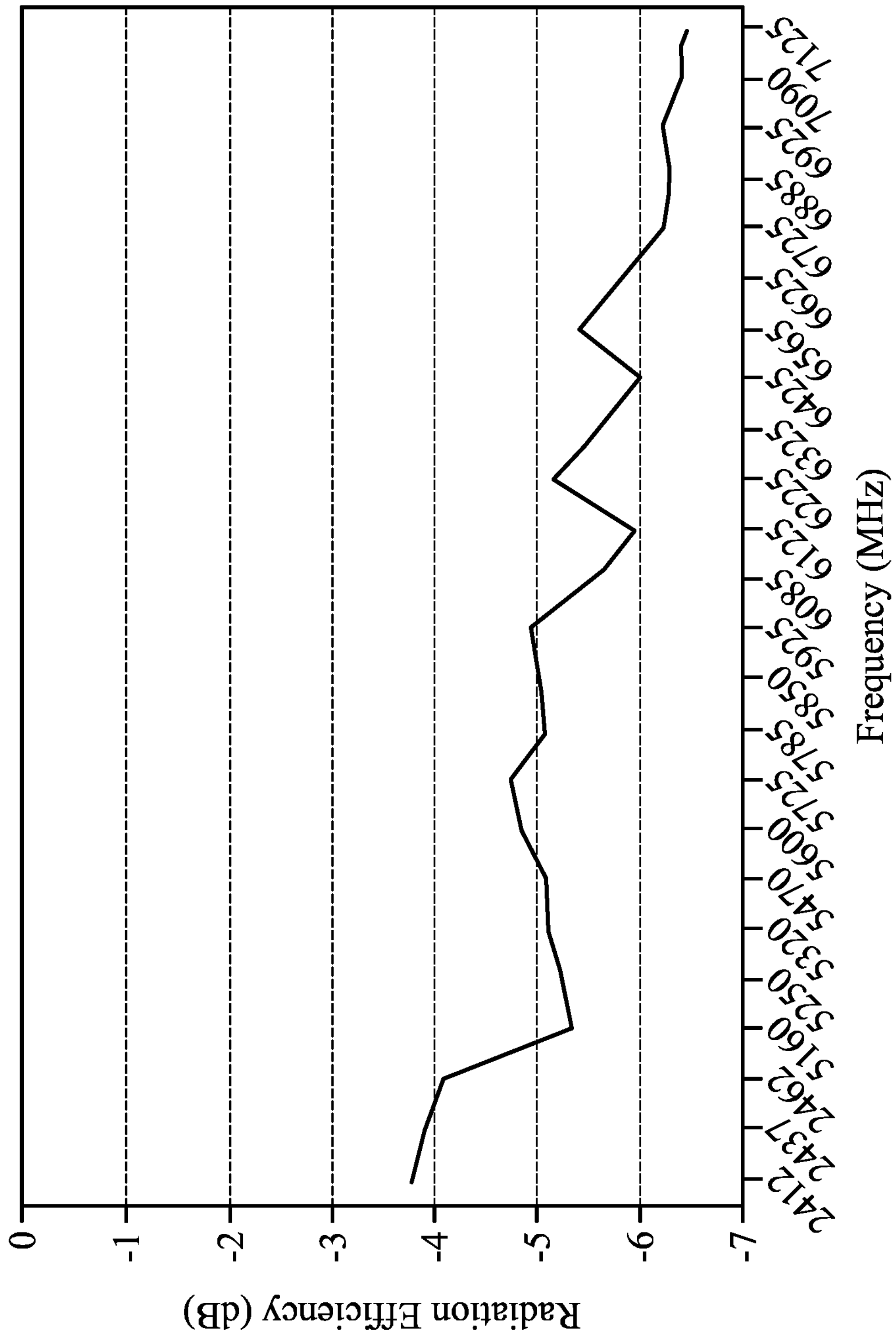
FIG. 3 is a diagram of radiation efficiency of an antenna structure of a mobile device according to an embodiment of the invention.

FIG. 3 is a diagram of radiation efficiency of the antenna structure of the mobile device 100 according to an embodiment of the invention. The horizontal axis represents the operational frequency (MHz), and the vertical axis represents the radiation efficiency (dB). According to the measurement of FIG. 3, the radiation efficiency of the antenna structure of the mobile device 100 can achieve −7 dB or higher within the first frequency band FB1, the second frequency band FB2, and the third frequency band FB3 as mentioned above. It can meet the requirements of practical applications of general mobile communication devices.

In some embodiments, the element sizes of the mobile device 100 will be described as follows. The total length L1 of the first radiation element 110 and the second radiation element 120 may be substantially equal to 0.25 wavelength (λ/4) of the first frequency band FB1 of the antenna structure of the mobile device 100. The total length L2 of the first radiation element 110 and the third radiation element 130 may be substantially equal to 0.25 wavelength (λ/4) of the second frequency band FB2 of the antenna structure of the mobile device 100. The length L3 of the fourth radiation element 140 may be substantially equal to 0.5 wavelength (λ/2) of the third frequency band FB3 of the antenna structure of the mobile device 100. Among the fourth radiation element 140, the length LA of its first portion 144 may be substantially equal to 0.25 wavelength (λ/4) of the third frequency band FB3 of the antenna structure of the mobile device 100, and the length LB of its second portion 145 may also be substantially equal to 0.25 wavelength (λ/4) of the third frequency band FB3 of the antenna structure of the mobile device 100. The length L4 of the fifth radiation element 150 may be substantially equal to 0.25 wavelength (λ/4) of the third frequency band FB3 of the antenna structure of the mobile device 100. The total length L5 of the sixth radiation element 160 and the seventh radiation element 170 may be substantially equal to 0.25 wavelength (λ/4) of the third frequency band FB3 of the antenna structure of the mobile device 100. The angle θ between the sixth radiation element 160 and the seventh radiation element 170 may be from 30 to 70 degrees. The width of the first coupling gap GC1 may be from 0.1 mm to 1 mm. The width of the second coupling gap GC2 may be from 0.5 mm to 1 mm. The width of the third coupling gap GC3 may be from 0.5 mm to 1 mm. The distance D1 between the second end 172 of the seventh radiation element 170 and the third radiation element 130 may be from 3 mm to 5 mm. The total height of the antenna structure of the mobile device 100 may be shorter than or equal to 6 mm. The above ranges of element sizes are calculated and obtained according to many experiment results, and they help to optimize the operational bandwidth and impedance matching of the antenna structure of the mobile device 100.

Figure 4:
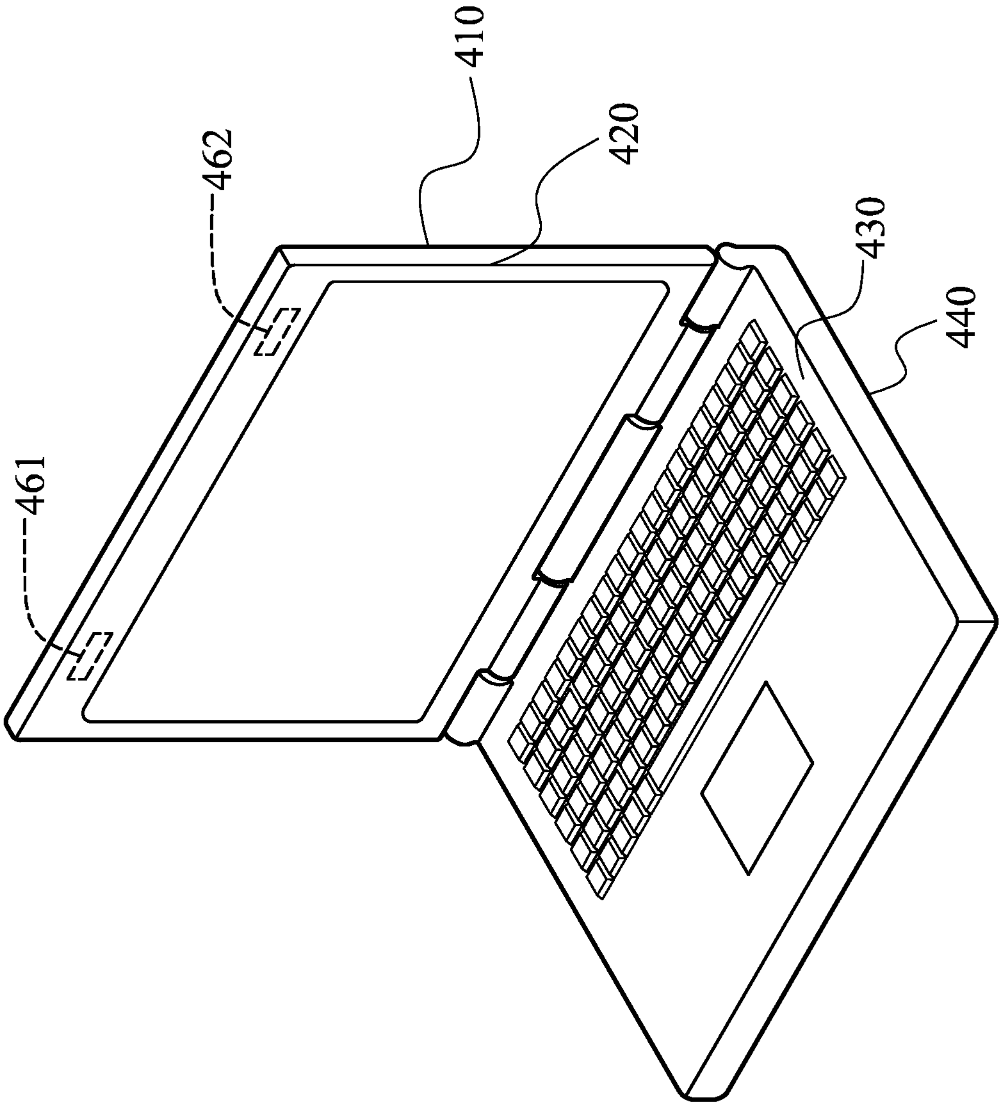
FIG. 4 is a perspective view of a notebook computer according to an embodiment of the invention.

FIG. 4 is a perspective view of a notebook computer 400 according to an embodiment of the invention. In the embodiment of FIG. 4, the aforementioned antenna structure is applied in a notebook computer 400. The notebook computer 400 includes an upper housing 410, a display frame 420, a keyboard frame 430, and a base housing 440. It should be understood that the upper housing 410, the display frame 420, the keyboard frame 430, and the base housing 440 are respectively equivalent to the so-called "A-component", "B-component", "C-component", and "D-component" in the field of notebook computers. The aforementioned antenna structure may be disposed at a first position 461 or a second position 462 of the notebook computer 400, and it may be covered by the nonconductive display frame 420. The first position 461 or the second position 462 may be adjacent to the display device of the notebook computer 400. According to practical measurements, since the total antenna height of the invention is very small, the proposed design can be applied in a variety of mobile devices with narrow borders, and it can also ensure good communication quality and acceptable operational bandwidth.

The invention proposes a novel mobile device with a novel antenna structure. In comparison to the conventional design, the invention has several advantages, including its small size, wide bandwidth, and low manufacturing cost. Therefore, the invention is suitable for application in a variety of mobile communication devices.

Note that the above element sizes, element shapes, and frequency ranges are not limitations of the invention. An antenna designer can fine-tune these settings or values according to different requirements. It should be understood that the mobile device of the invention is not limited to the configurations of FIGS. 1-4. The invention may merely include any one or more features of any one or more embodiments of FIGS. 1-4. In other words, not all of the features displayed in the figures should be implemented in the mobile device of the invention.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A mobile device supporting wideband operations, comprising:

a first radiation element, having a feeding point;

a second radiation element, coupled to the first radiation element;

a third radiation element, coupled to the first radiation element, wherein the third radiation element and the second radiation element substantially extend in opposite directions;

a fourth radiation element, wherein the first radiation element is coupled through the fourth radiation element to a ground voltage;

a fifth radiation element, coupled to the fourth radiation element, wherein the fifth radiation element is adjacent to the second radiation element;

a sixth radiation element, coupled to the ground voltage, wherein the sixth radiation element is adjacent to the first radiation element and the third radiation element; and a seventh radiation element, coupled to the sixth radiation element, wherein the seventh radiation element extends away from the third radiation element;

wherein an antenna structure is formed by the first radiation element, the second radiation element, the third radiation element, the fourth radiation element, the fifth radiation element, the sixth radiation element, and the seventh radiation element;

wherein an angle is formed between the seventh radiation element and the sixth radiation element;

wherein the angle is from 30 to 70 degrees.

2. The mobile device as claimed in claim 1, wherein a combination of the first radiation element, the second radiation element, and the third radiation element substantially has a T-shape.

3. The mobile device as claimed in claim 1, wherein the fourth radiation element substantially has a long L-shape.

4. The mobile device as claimed in claim 1, wherein the fifth radiation element substantially has a short L-shape.

5. The mobile device as claimed in claim 1, wherein the fifth radiation element is coupled to a central point on the fourth radiation element.

6. The mobile device as claimed in claim 5, wherein the fourth radiation element comprises a first portion and a second portion with equal lengths, and the central point is positioned between the first portion and the second portion.

7. The mobile device as claimed in claim 1, wherein the antenna structure covers a first frequency band, a second frequency band, and a third frequency band.

8. The mobile device as claimed in claim 7, wherein the first frequency band is from 2400 MHz to 2500 MHz, the second frequency band is from 5150 MHz to 5850 MHz, and the third frequency band is from 5925 MHz to 7125 MHz.

9. The mobile device as claimed in claim 7, wherein a total length of the first radiation element and the second radiation element is substantially equal to 0.25 wavelength of the first frequency band.

10. The mobile device as claimed in claim 7, wherein a total length of the first radiation element and the third radiation element is substantially equal to 0.25 wavelength of the second frequency band.

11. The mobile device as claimed in claim 7, wherein a length of the fourth radiation element is substantially equal to 0.5 wavelength of the third frequency band.

12. The mobile device as claimed in claim 7, wherein a length of the fifth radiation element is substantially equal to 0.25 wavelength of the third frequency band.

13. The mobile device as claimed in claim 7, wherein a total length of the sixth radiation element and the seventh radiation element is substantially equal to 0.25 wavelength of the third frequency band.

* * * * *